US011235683B2

(12) United States Patent
Nishio et al.

(10) Patent No.: US 11,235,683 B2
(45) Date of Patent: Feb. 1, 2022

(54) VEHICLE SEAT SLIDE APPARATUS

(71) Applicant: SHIROKI CORPORATION, Fujisawa (JP)

(72) Inventors: Takuya Nishio, Fujisawa (JP); Kohei Nishimoto, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 17/191,760

(22) Filed: Mar. 4, 2021

(65) Prior Publication Data

US 2021/0309125 A1 Oct. 7, 2021

(30) Foreign Application Priority Data

Apr. 1, 2020 (JP) .............................. JP2020-066161

(51) Int. Cl.
  *B60N 2/08* (2006.01)
  *B60N 2/07* (2006.01)

(52) U.S. Cl.
  CPC ......... *B60N 2/0705* (2013.01); *B60N 2/0727* (2013.01); *B60N 2/0818* (2013.01); *B60N 2/0875* (2013.01)

(58) Field of Classification Search
  CPC .. B60N 2/0705; B60N 2/0727; B60N 2/0818; B60N 2/0875; B60N 2/0715; B60N 2/0843; B60N 2/0862; B60N 2/0831; B60N 2/0868
  USPC ........................................ 248/429, 430, 424
  See application file for complete search history.

(56) References Cited

U.S. PATENT DOCUMENTS

| | | | | |
|---|---|---|---|---|
| 9,827,878 B1* | 11/2017 | Matsufuji | ................ | B60N 2/07 |
| 9,914,373 B2* | 3/2018 | Sato | ..................... | B60N 2/0818 |
| 10,160,351 B2* | 12/2018 | Sugimoto | ............ | B60N 2/0705 |
| 10,464,447 B2* | 11/2019 | Kimura | ................ | B60N 2/0705 |
| 2015/0314707 A1* | 11/2015 | Couasnon | ............ | B60N 2/0818 297/344.1 |
| 2018/0257514 A1* | 9/2018 | Taniguchi | ............. | B60N 2/085 |
| 2020/0276919 A1 | 9/2020 | Kumagai et al. | | |

FOREIGN PATENT DOCUMENTS

JP 2019116217 A 7/2019

OTHER PUBLICATIONS

U.S. Appl. No. 17/193,578, filed Mar. 5, 2021, Takuya Nishio.

* cited by examiner

*Primary Examiner* — Nkeisha Smith
(74) *Attorney, Agent, or Firm* — Buchanan Ingersoll & Rooney PC

(57) ABSTRACT

The vehicle seat slide apparatus includes a lower rail, an upper rail, a locking spring for restricting movement of the upper rail by engaging with the lower rail, and an unlocking member that releases an engagement state between the locking spring and the lower rail to release movement restriction of the upper rail. The unlocking member is located inside the locking spring in both a longitudinal direction and a width direction of the upper rail, the unlocking member is rotatably attached to a mounting member, and a wire support wall that supports a wire for operating the unlocking member is connected to the mounting member.

3 Claims, 10 Drawing Sheets

VEHICLE SEAT SLIDE APPARATUS

CROSS-REFERENCE TO RELATED APPLICATION

This application claims priority from Japanese Patent Application No. 2020-066161 filed with the Japan Patent Office on Apr. 1, 2020, the entire content of which is hereby incorporated by reference

BACKGROUND

1. Technical Field

An aspect of the present disclosure relates to a vehicle seat slide apparatus.

2. Related Art

The vehicle seat slide apparatus described in JP-A-2019-116217 includes a lower rail, an upper rail that supports a seat, an elongated locking spring, and an unlocking member. The upper rail is movably attached to the lower rail. The locking spring and the unlocking member are attached to the upper rail.

As illustrated in FIG. 13, an unlocking member 104 is attached to a mounting member 105. Further, a wire support wall 106 that supports a wire for operating the unlocking member 104 is connected to the upper rail 102.

SUMMARY

A vehicle seat slide apparatus includes: a lower rail; an upper rail that is movably attached to the lower rail and supports a seat; an annularly formed locking spring that is attached to the upper rail and has a locking portion for restricting movement of the upper rail by engaging with the lower rail; and an unlocking member that is attached to the upper rail and displaces the locking spring to release an engagement state between the locking spring and the lower rail to release movement restriction of the upper rail. The unlocking member is located inside the locking spring in both a longitudinal direction and a width direction of the upper rail, the unlocking member is rotatably attached to the mounting member, and a wire support wall that supports a wire for operating the unlocking member is connected to the mounting member.

DETAILED DESCRIPTION

Figure 1:
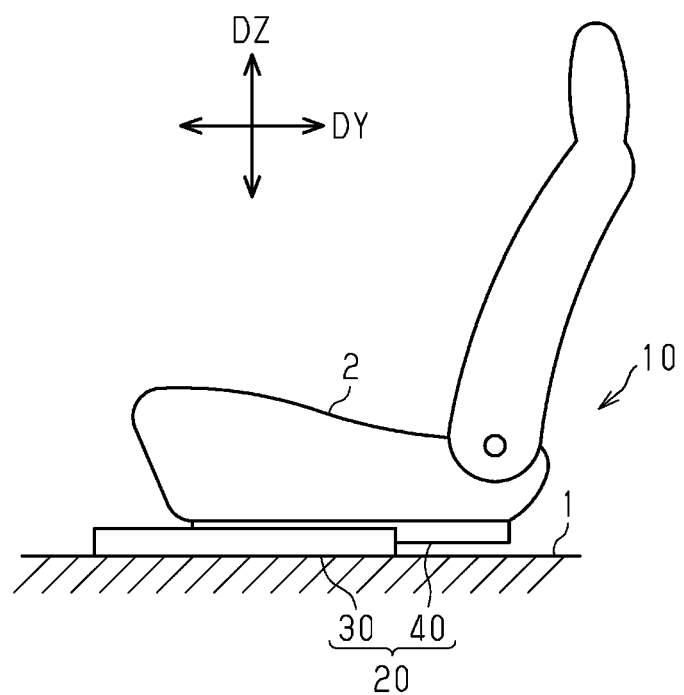
FIG. 1 is a side view of a vehicle seat slide apparatus on which a seat is mounted.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a vehicle seat slide apparatus 100 of JP-A-2019-116217, an unlocking member 104 and a wire support wall 106 are attached to separate members. Therefore, it is difficult to improve accuracy of a positional relationship between the two. If the accuracy of the positional relationship between the unlocking member 104 and the wire support wall 106 is low, it may be difficult to perform a smooth operation when operating the unlocking member 104 using the wire.

An object of the present disclosure is to provide a vehicle seat slide apparatus capable of easily improving the accuracy of the positional relationship between the unlocking member and the wire support wall.

A vehicle seat slide apparatus according to an aspect of the present disclosure (this vehicle seat slide apparatus) includes: a lower rail; an upper rail that is movably attached to the lower rail and supports a seat; an annularly formed locking spring that is attached to the upper rail and has a locking portion for restricting movement of the upper rail by engaging with the lower rail; and an unlocking member that is attached to the upper rail and displaces the locking spring to release an engagement state between the locking spring and the lower rail to release movement restriction of the upper rail. The unlocking member is located inside the locking spring in both a longitudinal direction and a width direction of the upper rail, the unlocking member is rotatably attached to the mounting member, and a wire support wall that supports a wire for operating the unlocking member is connected to the mounting member.

According to this configuration, the wire support wall is connected to the mounting member to which the unlocking member is attached. Therefore, it is easy to improve the accuracy of the positional relationship between the unlocking member and the wire support wall. Therefore, it is easy to smoothly operate the unlocking member using the wire.

In this vehicle seat slide apparatus, it is preferred that a spring material mounting wall to which a spring material for urging the unlocking member is attached is connected to one end portion in a longitudinal direction of the mounting member. According to this configuration, both the unlocking member and the spring material mounting wall are attached to the mounting member. Therefore, it is easy to improve accuracy of a positional relationship between the unlocking member and the spring material mounting wall.

In this vehicle seat slide apparatus, it is preferred that the wire support wall is connected to the other end portion in the longitudinal direction of the mounting member. According to this configuration, it is possible to suppress interference of the wire support wall with other members attached to the mounting member.

According to the vehicle seat slide apparatus, the accuracy of the positional relationship between the unlocking member and the wire support wall can be easily improved.

An embodiment of the vehicle seat slide apparatus will be described.

As illustrated in FIG. 1, a vehicle seat slide apparatus 10 is mounted with a seat 2 and is mounted on a vehicle floor 1. The vehicle seat slide apparatus 10 can move the seat 2 in a front-rear direction of a vehicle and can fix the seat 2 at a predetermined position.

Figure 2:
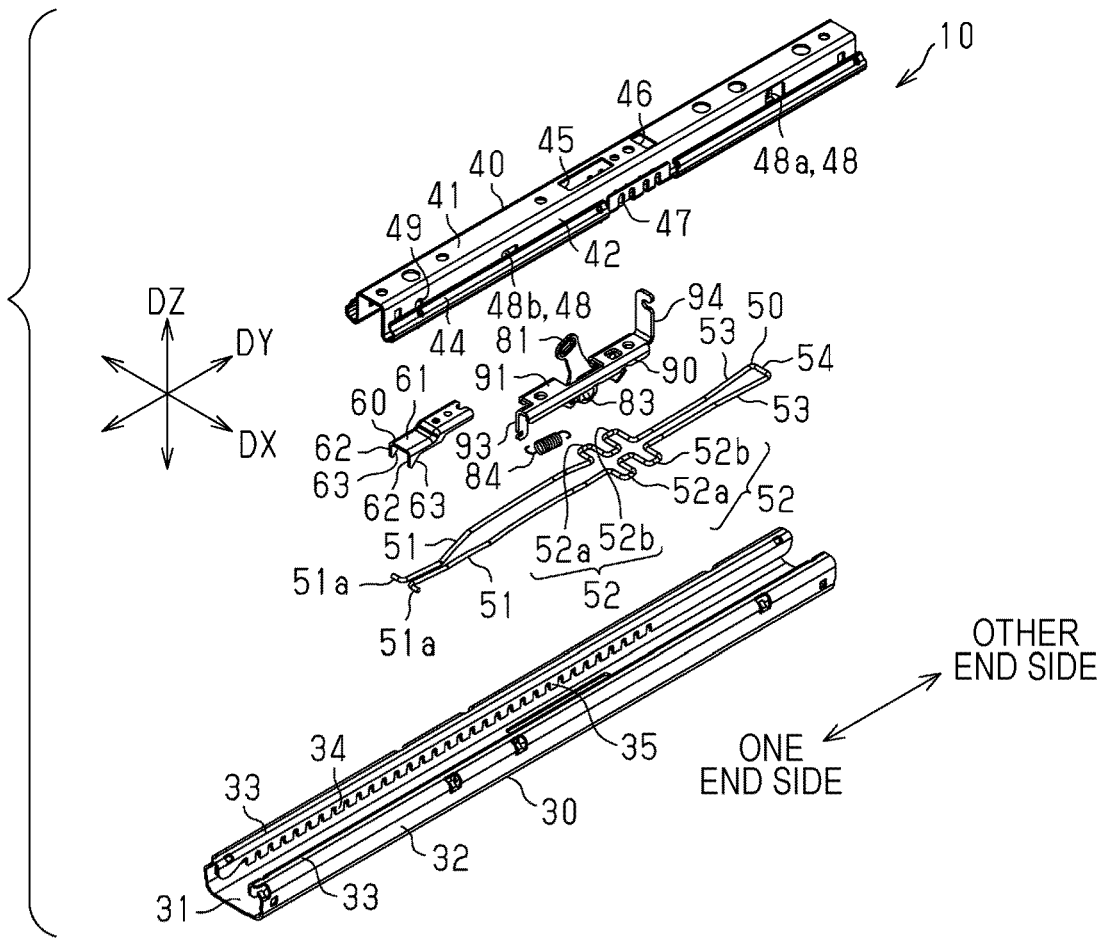
FIG. 2 is an exploded perspective view of the vehicle seat slide apparatus.
Figure 3:
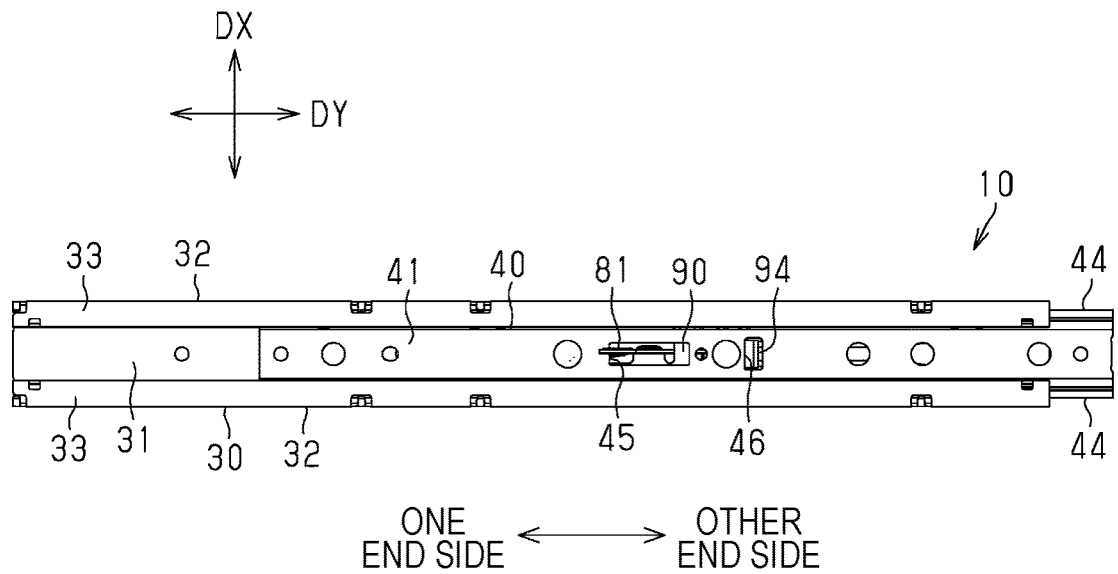
FIG. 3 is a plan view of the vehicle seat slide apparatus.

As illustrated in FIGS. 1 to 3, the vehicle seat slide apparatus 10 includes a slide rail 20. The slide rail 20 includes a lower rail 30 that is attached to the vehicle floor 1 and an upper rail 40 that is movably attached to the lower rail 30 and supports the seat 2. A pair of lower rails 30 and a pair of upper rails 40 are provided. Here, when the slide rail 20 is installed on the vehicle floor 1, a direction in the front-rear direction of the vehicle is referred to as a "front-rear direction DY", a direction in a width direction of the vehicle is referred to as a "width direction DX", and a direction in a vertical direction of the vehicle is referred to as a "vertical direction DZ". Note that the front-rear direction DY of the vehicle seat slide apparatus 10 coincides with a "longitudinal direction" of the lower rail 30 and the upper rail 40 of the vehicle seat slide apparatus 10. Further, the vertical direction DZ is a direction perpendicular to both the front-rear direction DY and the width direction DX.

A configuration of the slide rail 20 will be described.

Figure 5:
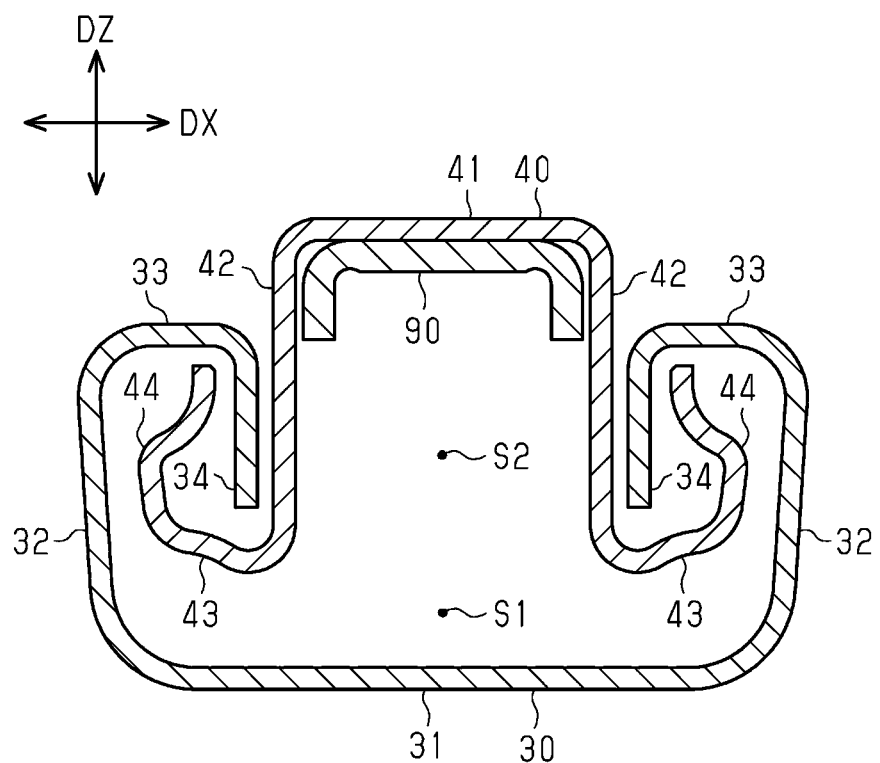
FIG. 5 is a schematic view of the vehicle seat slide apparatus as viewed from a front-rear direction.

As illustrated in FIG. 5, the lower rail 30 includes a plate-shaped bottom wall portion 31 fixed to the vehicle floor 1. A pair of side wall portions 32 extending upward in the vertical direction DZ is provided at both ends of the bottom wall portion 31 in the width direction DX. A pair of horizontal wall portions 33 extending inward of the bottom wall portion 31 in the width direction DX is respectively provided at ends of the pair of side wall portions 32 opposite to the bottom wall portion 31. A pair of vertical wall portions 34 extending downward in the vertical direction DZ is respectively provided at ends of the pair of horizontal wall portions 33 opposite to the side wall portions 32. The pair of vertical wall portions 34 is provided at an interval. A gap is formed between the vertical wall portions 34. The lower rail 30 has an internal space S1 surrounded by the bottom wall portion 31, the pair of side wall portions 32, the pair of horizontal wall portions 33, and a pair of vertical wall portions 34. The internal space S1 communicates with an external space through the gap between the vertical wall portions 34 in the vertical direction DZ.

Figure 4:
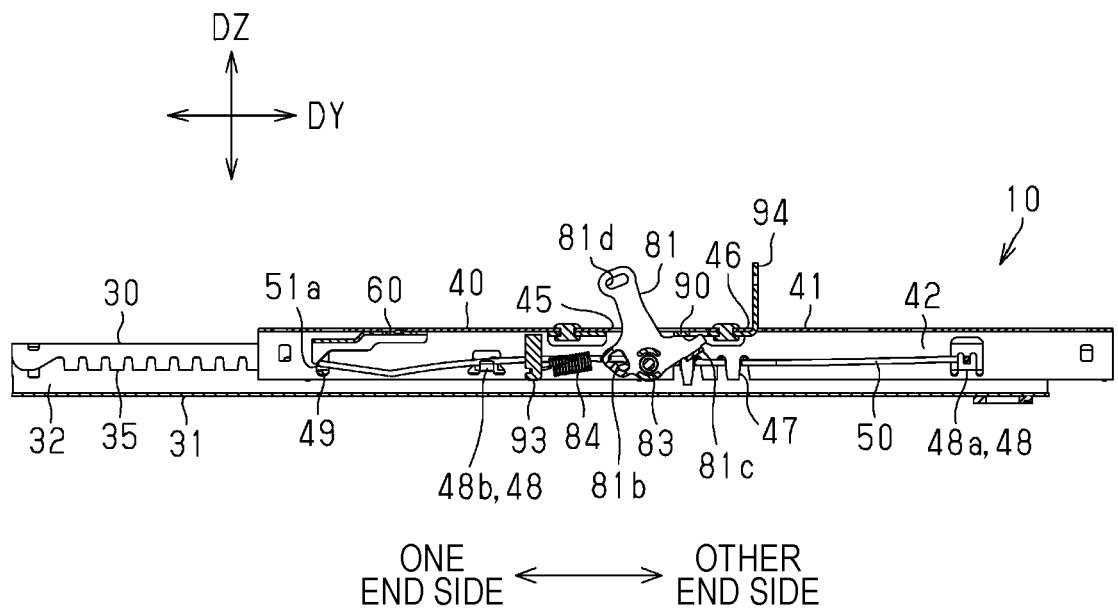
FIG. 4 is a cross-sectional view of the vehicle seat slide apparatus illustrated in FIG. 3.

As illustrated in FIGS. 2 and 4, the vertical wall portion 34 of the lower rail 30 is provided with a first cutout 35 extending upward from a lower end thereof in the vertical direction DZ. A plurality of the first cutouts 35 is formed at equal intervals in the front-rear direction DY of the lower rail 30. Movement of the upper rail 40 is restricted by engaging a locking spring 50 with both the first cutout 35 and a second cutout 47 of the upper rail 40 to be described below.

As illustrated in FIG. 5, the upper rail 40 includes a plate-shaped top wall portion 41 extending parallel to the vehicle floor 1. A pair of side wall portions 42 extending downward in the vertical direction DZ is provided at both ends of the top wall portion 41 in the width direction DX. A pair of horizontal wall portions 43 extending outward of the top wall portion 41 in the width direction DX is respectively provided at ends of the pair of side wall portions 42 opposite to the top wall portion 41. A pair of vertical wall portions 44 extending upward in the vertical direction DZ is respectively provided at ends of the pair of horizontal wall portions 43 opposite to the side wall portions 42. The upper rail 40 has an internal space S2 surrounded by the top wall portion 41 and the pair of side wall portions 42.

As illustrated in FIGS. 2 and 3, the top wall portion 41 of the upper rail 40 is formed with an insertion hole 45 into which a plate member of an unlocking member 81 to be described below is inserted, and an insertion hole 46 into which a fourth wall portion 94 of a mounting member 90 is inserted.

As illustrated in FIGS. 2 and 4, the vertical wall portion 44, the horizontal wall portion 43, and the side wall portion 42 at a center of the upper rail 40 in the longitudinal direction are provided with a second cutout 47 extending upward from a lower end thereof in the vertical direction DZ. Four second cutouts 47 are formed at equal intervals in the front-rear direction DY of the upper rail 40. A total of eight second cutouts 47 are formed at positions facing each other with respect to the pair of side wall portions 42. A shape of the second cutout 47 and a distance between the second cutouts 47 are set to be substantially equal to the first cutout 35 provided in the lower rail 30. The second cutout 47 functions as an engaged portion with which a curved portion 52 of the locking spring 50 to be described below is engaged.

As illustrated in FIG. 5, the upper rail 40 is slidably attached to the lower rail 30 in a state where the pair of horizontal wall portions 43 is inserted into the internal space S1 of the lower rail 30 through the gap formed between the pair of vertical wall portions 34 of the lower rail 30. With the upper rail 40 attached to the lower rail 30, since the horizontal wall portion 43 of the upper rail 40 and the horizontal wall portion 33 of the lower rail 30 are arranged at positions overlapping each other in the vertical direction DZ, it is possible to suppress separation of the upper rail 40 from the lower rail 30 in the vertical direction DZ. Then, the upper rail 40 is restricted from moving by the locking spring 50 engaging with the first cutout 35 and the second cutout 47 in a state where positions of the first cutout 35 of the lower rail 30 and the second cutout 47 of the upper rail 40 overlap each other.

As illustrated in FIG. 4, the pair of side wall portions 42 of the upper rail 40 has claws 48 which are part of the side wall portion 42 folded back inward in the width direction DX and respectively formed at two locations (four locations in total) on one end side and the other end side of the upper rail 40 in the front-rear direction DY. As will be described below, the locking spring 50 is supported on the claws 48 in a locked state, so that the locking spring 50 is installed the internal space S2 of the upper rail 40. Hereinafter, the claws 48 on the other end side of the upper rail 40 are referred to as first locking portions 48a, and the claws 48 on the one end side of the upper rail 40 are referred to as second locking portions 48b.

As illustrated in FIG. 4, an oval through-hole 49 elongated in the vertical direction DZ is provided on one end side of the side wall portion 42 of the upper rail 40 with respect to the second locking portion 48b. The through-hole 49 is provided so that a bent portion 51a of the locking spring 50 to be described below is located inside an edge of the through-hole 49 when the upper rail 40 is viewed in the width direction DX.

As illustrated in FIG. 2, a bracket 60 is attached to a lower surface of the top wall portion 41 of the upper rail 40. The bracket 60 will be described below.

A configuration of the locking spring 50 will be described.

As illustrated in FIG. 2, the locking spring 50 is formed in an elongated annular shape by bending a flexible wire rod, and is formed in an elongated shape as a whole.

The locking spring 50 has a pair of first extension portions 51 and a pair of curved portions 52. The pair of first extension portions 51 extends along the pair of side wall portions 42 of the upper rail 40 in a state where the locking spring 50 is installed in the internal space S2 of the upper rail 40. The pair of curved portions 52 is curved outward in the width direction DX on the other end sides of the first extension portions 51. Further, the locking spring 50 has a pair of second extension portions 53 extending along the pair of side wall portions 42 of the upper rail 40 and a connecting portion 54 for connecting the other end sides of the second extension portions 53 on the other end sides of the curved portions 52. The locking spring 50 is configured such that the curved portion 52 is located at a substantially central portion in the longitudinal direction of the locking spring 50 as a whole. The curved portion 52 of the locking spring 50 has a shape projecting outward in the width direction DX at two different locations in the front-rear direction DY. That is, the curved portion 52 has a first curved portion 52a on the one end side and a second curved portion 52b on the other end side.

The pair of first extension portions 51 of the locking spring 50 is configured to approach each other toward the one end side. Each end on the one end side of the pair of first extension portions 51 has a bent portion 51a bent and extending outward in the width direction DX. In other words, the bent portion 51a is located at the end on the one end side in the longitudinal direction of the locking spring 50. A gap is formed between the bent portions 51a. The locking spring 50 is formed in an open annular shape between the bent portions 51a.

The pair of second extension portions 53 of the locking spring 50 is formed to extend along each other and toward the other end side. The locking spring 50 has the connecting portion 54 for connecting the pair of second extension portions 53 at an end on the other end side of the pair of second extension portions 53. In other words, the connecting portion 54 is located at the end on the other end side in the longitudinal direction of the locking spring 50.

As illustrated in FIG. 4, the locking spring 50 is installed in the internal space S2 of the upper rail 40 in a state where the connecting portion 54 of the locking spring 50 is supported by grooves of the first locking portions 48a provided in the pair of side wall portions 42 of the upper rail 40 so as to be sandwiched from the front-rear direction DY, and in a state where the first extension portions 51 of the locking spring 50 are supported on the second locking portions 48b. Since the connecting portion 54 of the locking spring 50 is supported on the first locking portions 48a, the other end side of the locking spring 50 is fixed to the upper rail 40. Further, since the first extension portions 51 of the locking spring 50 are supported on the second locking portions 48b, the one end side of the locking spring 50 is movably attached to the upper rail 40.

The locking spring 50 is supported so that the curved portion 52 is located substantially in the middle between a portion supported by the second locking portion 48b on the one end side in the longitudinal direction and a portion supported by the first locking portion 48a on the other end side in the longitudinal direction. The first curved portion 52a and the second curved portion 52b of the curved portion 52 of the locking spring 50 engage with both the second cutout 47 of the upper rail 40 and the first cutout 35 of the lower rail 30, so that the upper rail 40 is restricted from moving. Therefore, the curved portion 52 of the locking spring 50 functions as the locking portion. The curved portion 52, which is the locking portion, is provided in a substantially central portion of the locking spring 50 in the longitudinal direction, that is, between the one end side and the other end side in the longitudinal direction of the locking spring 50. Further, the locking spring 50 is formed so that the curved portion 52 located on the central portion side in the longitudinal direction of the locking spring 50 can be displaced (pushed down) downward in the vertical direction DZ by bending the locking spring 50 with the portion supported by the first locking portion 48a and the portion supported by the second locking portion 48b as fulcrums.

A configuration of the bracket 60 will be described.

Figure 6:
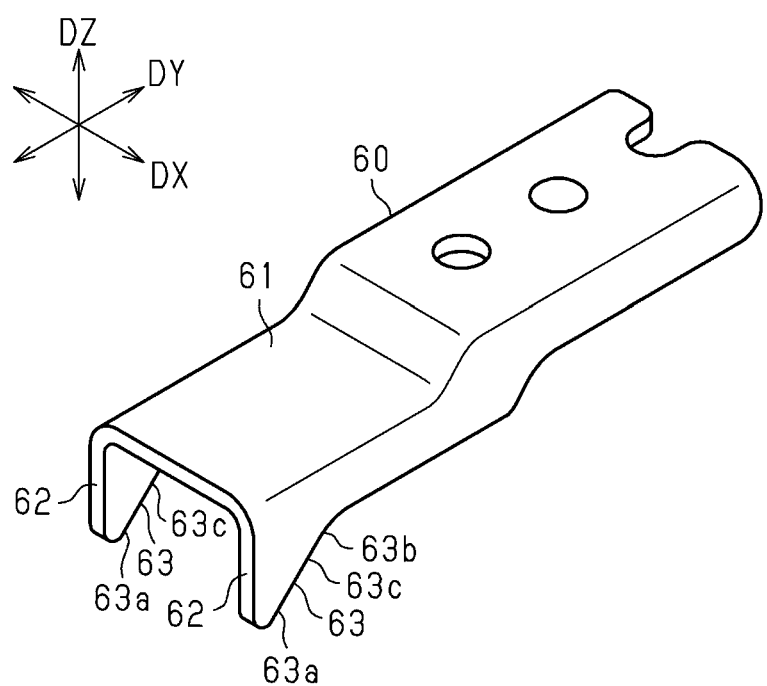
FIG. 6 is a perspective view of a contact member.

As illustrated in FIG. 6, the bracket 60 has a rectangular plate-shaped upper wall portion 61 and a pair of contact walls 62. The pair of contact walls 62 extends downward from both sides in a short direction of the upper wall portion 61 on one end side in the longitudinal direction (front side in the front-rear direction DY) of the upper wall portion 61. A lower end portion 63 of the contact wall 62 extends linearly from one end side in the longitudinal direction of the upper wall portion 61 so as to incline upward toward the other end side. In other words, the lower end portion 63 of the contact wall portion 62 is linearly inclined from the lower side to the upper side, from the one end side in the longitudinal direction of the upper wall portion 61 toward the other end side.

As illustrated in FIG. 4, the bracket 60 is attached to the inside of the top wall portion 41 and the side wall portions 42 of the upper rail 40, to be used. When viewed from the width direction DX, the contact wall 62 of the bracket 60 overlaps an upper portion of the through-hole 49 provided in the side wall portion 42 of the upper rail 40. Then, the bent portion 51a of the locking spring 50 is in contact with the lower end portion 63 of the contact wall 62.

As will be described below, a lower side 63a in the lower end portion 63 of the contact wall 62 of the bracket 60 functions as the during locking restricting portion that restricts the movement of the one end side of the locking spring 50 by contacting the one end side of the locking spring 50 when the locking spring 50 is in the locked state. Similarly, an upper side 63b in the lower end portion 63 of the contact wall 62 of the bracket 60 functions as the during unlocking restricting portion that restricts the movement of the one end side of the locking spring 50 by contacting the one end side of the locking spring 50 when the locking spring 50 is in the unlocked state. Then, a central portion 63c between the lower side 63a and the upper side 63b in the lower end portion 63 of the contact wall 62 of the bracket 60 functions as the inclined portion.

Here, positions of the "lower side 63a", the "upper side 63b", and the "central portion 63c" in the lower end portion 63 of the contact wall 62 are not strictly limited positions. A portion where the bent portion 51a of the locking spring 50 in the locked state contacts in the lower end portion 63 of the contact wall 62 is the "lower side 63*a*", and a portion above the lower side 63*a*, where the bent portion 51*a* of the locking spring 50 in the unlocked state contacts is the "upper side 63*b*". Then, a portion between the lower side 63*a* and the upper side 63*b* is the central portion 63*c*.

By attaching the bracket 60 to the upper rail 40, the during locking restricting portion and the during unlocking restricting portion are provided on the upper rail 40. In other words, the upper rail 40 is in a state of having the during locking restricting portion and the during unlocking restricting portion.

A configuration of the unlocking member 81 will be described.

Figure 7A:
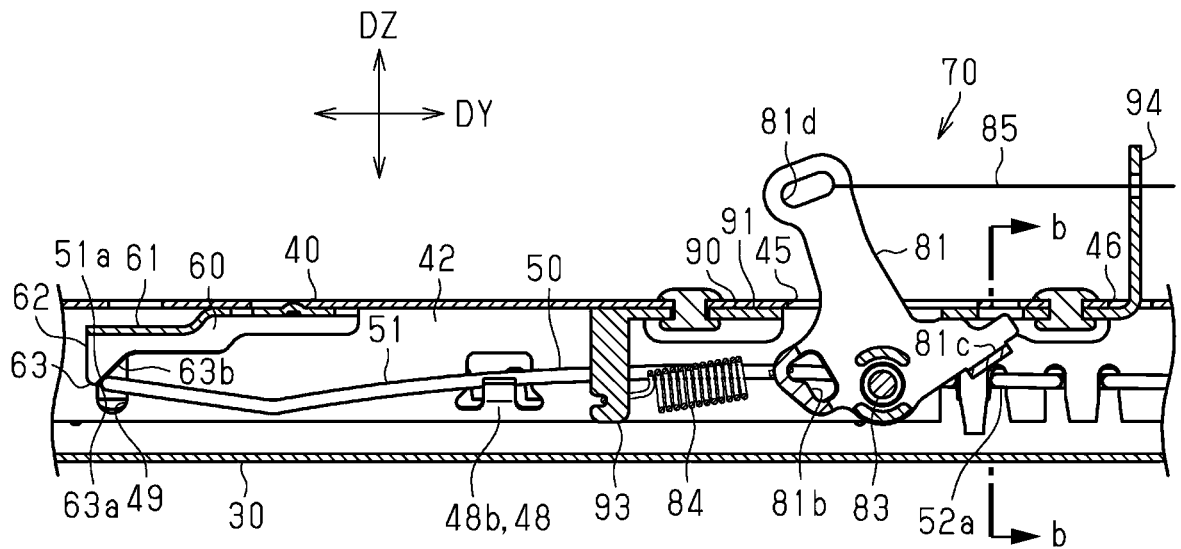
FIG. 7A is a partially enlarged view of the vehicle seat slide apparatus illustrated in FIG. 4.
Figure 9A:
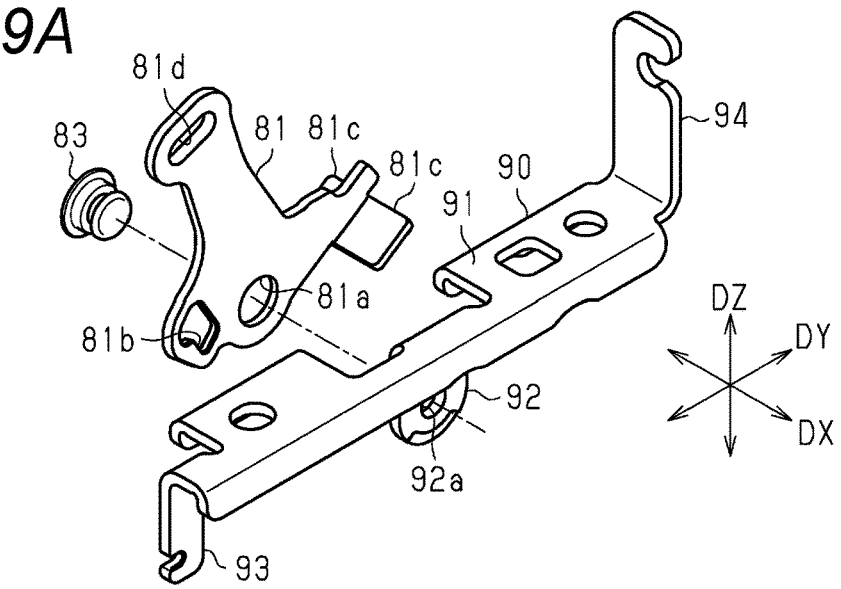
FIG. 9A is an exploded perspective view of an unlocking member and a mounting member of an unlocking mechanism.
Figure 9B:
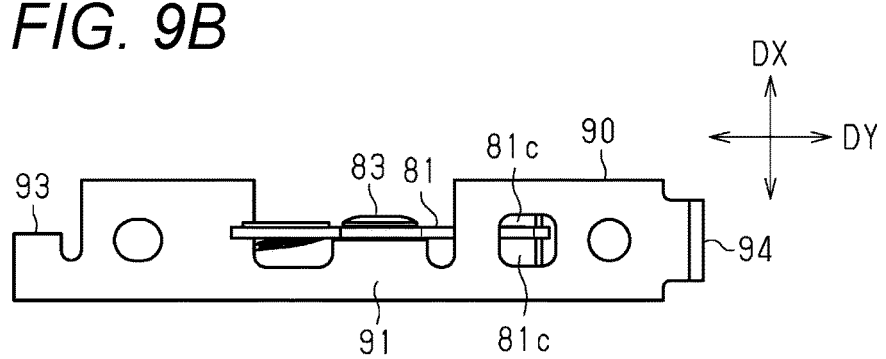
FIG. 9B is a plan view thereof.
Figure 9C:
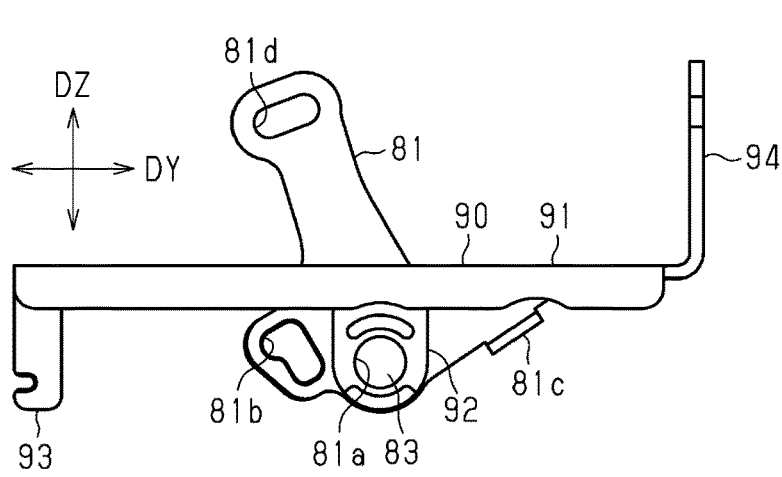
FIG. 9C is a side view thereof.
Figure 9D:
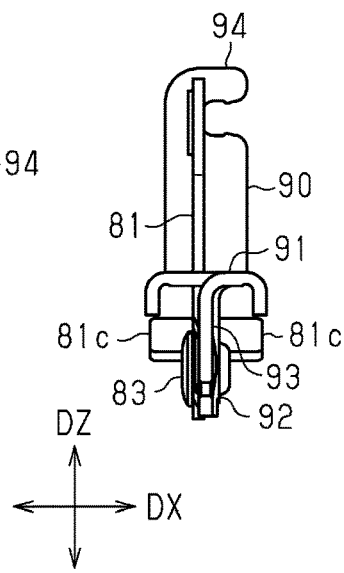
FIG. 9D is a front view thereof.

As illustrated in FIG. 7A, the unlocking member 81 has an elongated plate member. A shaft hole 81*a* (see FIG. 9A) into which a shaft member 83 is inserted is formed at one end in a longitudinal direction of the plate member. A mounting hole 81*b* is provided adjacent to the shaft hole 81*a* at one end in a short direction of the plate member. A spring material 84 for urging the unlocking member 81 is attached to the mounting hole 81*b*. A pressing portion 81*c* for pressing the locking portion of the locking spring 50 is provided adjacent to the shaft hole 81*a* at the other end in the short direction of the unlocking member 81. The pressing portion 81*c* is formed as a projecting piece projecting to both sides of the plate member in a thickness direction of the plate member of the unlocking member 81.

A through-hole 81*d* is provided at the other end in the longitudinal direction of the plate member of the unlocking member 81. A wire 85 for operating the unlocking member 81 is attached to the through-hole 81*d*. An unlocking mechanism 70 has the unlocking member 81 and the wire 85.

As illustrated in FIG. 2, the unlocking member 81 is attached to the mounting member 90 installed in the internal space S2 of the upper rail 40, to be used.

A configuration of the mounting member 90 will be described.

As illustrated in FIGS. 2 and 5, the mounting member 90 is formed in an elongated shape, and is attached to an inside of the top wall portion 41 and the side wall portions 42 of the upper rail 40, to be used. The mounting member 90 is attached by welding or caulking to the inside of the top wall portion 41 and the side wall portions 42 where the second cutouts 47 are formed in the upper rail 40, so that strength around a portion where the second cutouts 47 are formed in the upper rail 40 is reinforced. That is, the mounting member 90 is provided around the second cutouts 47 at a position overlapping at least the second cutouts 47 in the width direction of the upper rail 40.

As illustrated in FIGS. 9A to 9D, the mounting member 90 has an elongated first wall portion 91 and a second wall portion 92. The first wall portion 91 is curved to follow shapes of the top wall portion 41 and the side wall portions 42 of the upper rail 40. The second wall portion 92 is formed by cutting and raising a central portion in a longitudinal direction (the front-rear direction DY) of the first wall portion 91 downward in the vertical direction DZ. Further, the mounting member 90 has a third wall portion 93. The third wall portion 93 is formed by cutting and raising a front end portion in the longitudinal direction of the first wall portion 91 downward in the in the vertical direction DZ. The second wall portion 92 and the third wall portion 93 extend downward of the upper rail 40 from a central portion in the width direction DX of the first wall portion 91, and wall surfaces thereof are cut and raised in the front-rear direction DY and the vertical direction DZ.

The mounting member 90 has a fourth wall portion 94. The fourth wall portion 94 is formed by raising a rear end portion in the longitudinal direction of the first wall portion 91 upward in the vertical direction DZ. The wall surface of the fourth wall portion 94 is raised in the width direction DX and the vertical direction DZ.

The first wall portion, the second wall portion, the third wall portion, and the fourth wall portion are formed of one plate material. In other words, the walls are connected to each other in an integrated state.

The second wall portion 92 is provided with a through-hole 92*a*. The unlocking member 81 is attached to the through-hole 92*a*. The spring material 84 for urging the unlocking member 81 is attached to the third wall portion 93. The third wall portion 93 functions as a spring material mounting wall. In other words, the spring material mounting wall is connected to one end portion (a front end portion) in the longitudinal direction of the mounting member 90.

A wire support (not shown) for supporting the wire 85 attached to the through-hole 81*d* of the unlocking member 81 is attached to the fourth wall portion 94. The fourth wall portion 94 functions as a wire support wall that supports the wire 85. In other words, the wire support wall is connected to the other end portion (rear end portion) in the longitudinal direction of the mounting member 90.

An assembly configuration of the unlocking member 81 will be described.

As illustrated in FIGS. 9A to 9D, in a state where the through-hole 92*a* of the second wall portion 92 of the mounting member 90 and the shaft hole 81*a* of the plate member of the unlocking member 81 overlap each other, by attaching the shaft member 83 to the through-hole 92*a* and the shaft hole 81*a*, the plate member of the unlocking member 81 is rotatably attached to the second wall portion 92.

As illustrated in FIG. 4, the unlocking member 81 is attached to the upper rail 40 by attaching the mounting member 90, to which the unlocking member 81 is attached, to the inside of the upper rail 40 by welding or caulking. In this state, the plate member of the unlocking member 81 has the other end side in the longitudinal direction projecting upward from the insertion hole 45 of the top wall portion 41 of the upper rail 40. Further, the fourth wall portion 94 of the mounting member 90 is in a state of projecting upward from the insertion hole 46 of the top wall portion 41 of the upper rail 40.

As illustrated in FIG. 4, the spring material 84 fixed to the third wall portion 93 of the mounting member 90 is attached to the mounting hole 81*b* of the plate member of the unlocking member 81. The spring material 84 brings the plate member of the unlocking member 81 into a state of being urged forward in the front-rear direction DY.

As illustrated in FIG. 7A, the unlocking member 81 is configured such that the pressing portion 81*c* of the unlocking member 81 is located above the first curved portion 52*a* of the locking spring 50 in a state where the unlocking member 81 is attached to the upper rail 40.

In a state where the unlocking member 81 is attached to the mounting member 90, and the mounting member 90 to which the unlocking member 81 is attached is attached to the inside of the upper rail 40, the unlocking member 81 is disposed in a region between the pair of first extension portions 51 (a region sandwiched between the pair of first extension portions 51) of the locking spring 50. Specifically, the plate member of the unlocking member 81 is disposed between the pair of first extension portions 51 of the locking spring 50 with a surface of a plate material of the plate member being in the vertical direction DZ and the front-rear direction DY. Thus, the unlocking member 81 is in a state of being positioned inside the locking spring 50 in both the longitudinal direction and the width direction of the upper rail 40. Further, the unlocking member 81 is in a state of being positioned to cross the locking spring 50 in the vertical direction of the upper rail 40. That is, when the upper rail 40 is viewed from the width direction DX, the through-hole 81d to which the wire 85 of the plate member is attached and the pressing portion 81c are both located above the locking spring 50 in the vertical direction DZ. Further, the shaft hole 81a of the plate member is positioned overlapping the locking spring 50, or is positioned below the locking spring 50 in the vertical direction DZ.

Figure 7B:
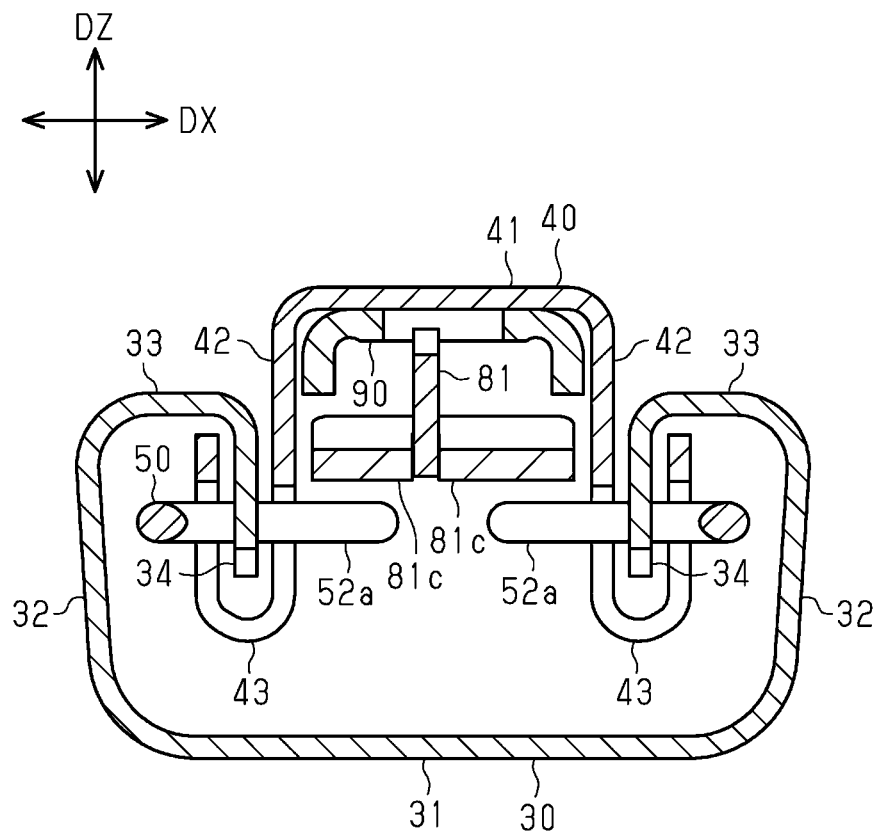
FIG. 7B is a cross-sectional view taken along a line b-b of the vehicle seat slide apparatus illustrated in FIG. 7A.

As illustrated in FIGS. 7A and 7B, when the locking spring 50 and the lower rail 30 are in the engaged state, the bent portion 51a of the locking spring 50 contacts the lower side 63a in the lower end portion 63 of the contact wall 62 of the bracket 60. Since the bent portion 51a of the locking spring 50 contacts the lower side 63a in the lower end portion 63 of the contact wall 62 of the bracket 60, the one end side of the locking spring 50 including the bent portion 51a is restricted from moving forward in the front-rear direction DY and upward in the vertical direction DZ. Therefore, the lower side 63a in the lower end portion 63 of the contact wall 62 is the during locking restricting portion.

Since the bent portion 51a of the locking spring 50 contacts the during locking restricting portion, a reduction of the urging force of the locking spring 50 due to, for example, the one end side of the locking spring 50 moving forward in the front-rear direction DY or upward in the vertical direction DZ can be suppressed.

Figure 8A:
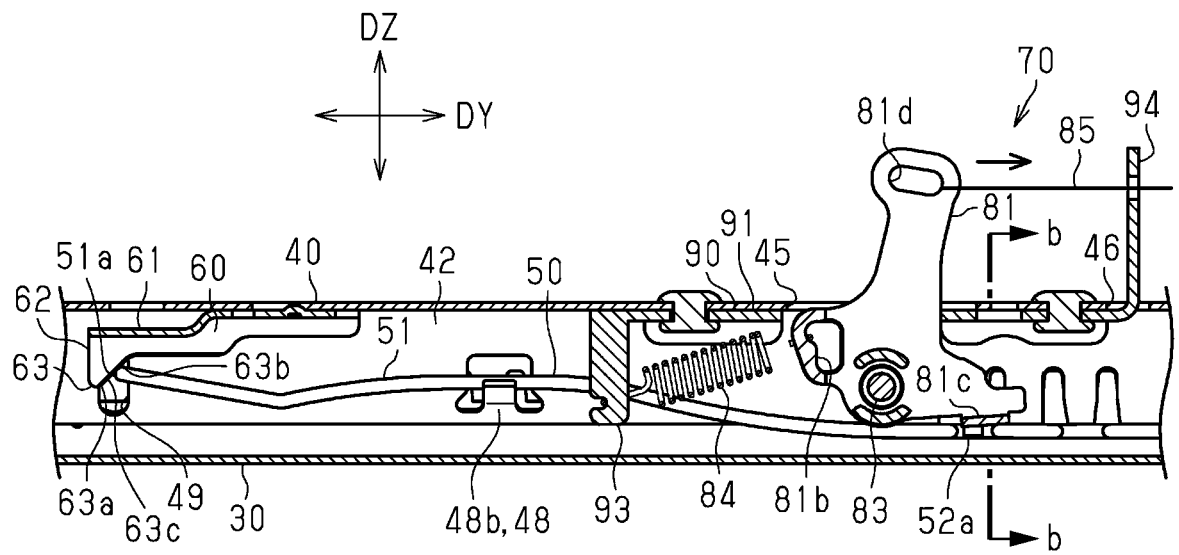
FIG. 8A is a partially enlarged view of the vehicle seat slide apparatus at the time of unlocking.
Figure 8B:
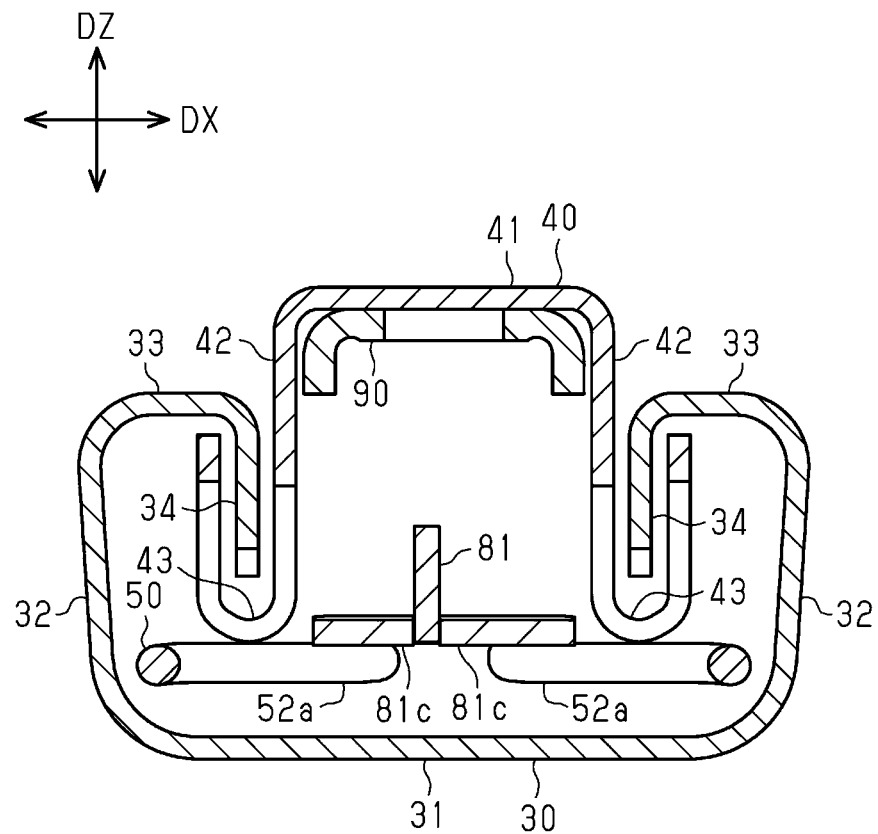
FIG. 8B is a cross-sectional view taken along a line b-b of the vehicle seat slide apparatus illustrated in FIG. 8A.

As illustrated in FIGS. 8A and 8B, when the engagement state between the locking spring 50 and the lower rail 30 is released, the wire 85 attached to the through-hole 81d of the plate member of the unlocking member 81 is pulled backward in a direction of an arrow while being supported by the wire support. Thus, the through-hole 81d side of the plate member is rotated about the shaft hole 81a clockwise in the drawing. As a result, the through-hole 81d side of the plate member of the unlocking member 81 moves rearward in the front-rear direction DY.

When the through-hole 81d side of the plate member of the unlocking member 81 moves rearward in the front-rear direction DY, the pressing portion 81c of the unlocking member 81 moves downward in the vertical direction DZ to press down the first curved portion 52a of the locking spring 50. Since the first curved portion 52a of the locking spring 50 is pressed down, the locking spring 50 is in a bent state. Thus, the curved portion 52 of the locking spring 50 is displaced downward in the vertical direction DZ from the second cutout 47 of the upper rail 40 and the first cutout 35 of the lower rail 30. As a result, an engagement between the curved portion 52 of the locking spring 50, the second cutout 47 of the upper rail 40, and the first cutout 35 of the lower rail 30 is released, and movement restriction of the upper rail 40 is released.

When the engagement state between the locking spring 50 and the lower rail 30 is released, the one end side of the locking spring 50 with respect to the portion supported by the second locking portion 48b moves upward in the vertical direction DZ. Thus, a stress applied to the locking spring 50 is relieved. At that time, the bent portion 51a of the locking spring 50 moves while contacting the central portion 63c in the lower end portion 63 of the contact wall 62 of the bracket 60. Then, the bent portion 51a of the locking spring 50 is in contact with the upper side 63b in the lower end portion 63 of the contact wall 62 of the bracket 60. Since the bent portion 51a of the locking spring 50 contacts the upper side 63b in the lower end portion 63 of the contact wall 62 of the bracket 60, the one end side of the locking spring 50 including the bent portion 51a is continuously restricted from moving forward in the front-rear direction DY and upward in the vertical direction DZ. Therefore, the upper side 63b in the lower end portion 63 of the contact wall 62 is the during unlocking restricting portion.

Since the bent portion 51a of the locking spring 50 contacts the during unlocking restricting portion, the reduction of the urging force of the locking spring 50 due to, for example, the one end side of the locking spring 50 moving forward in the front-rear direction DY or upward in the vertical direction DZ can be suppressed.

The inclined central portion 63c between the during locking restricting portion (lower side 63a of the lower end portion 63) and the during unlocking restricting portion (upper side 63b of the lower end portion 63) in the lower end portion 63 of the contact wall 62 of the bracket 60 is the inclined portion.

Figure 10A:
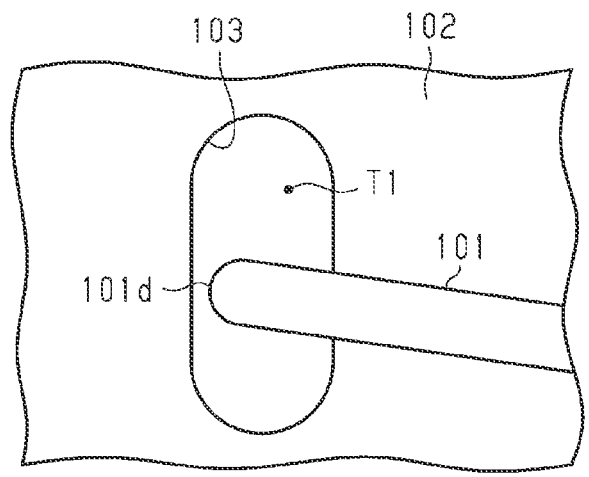
FIG. 10A is a schematic view illustrating a movable range of an end on one end side in a locking spring of a related technology.
Figure 10B:
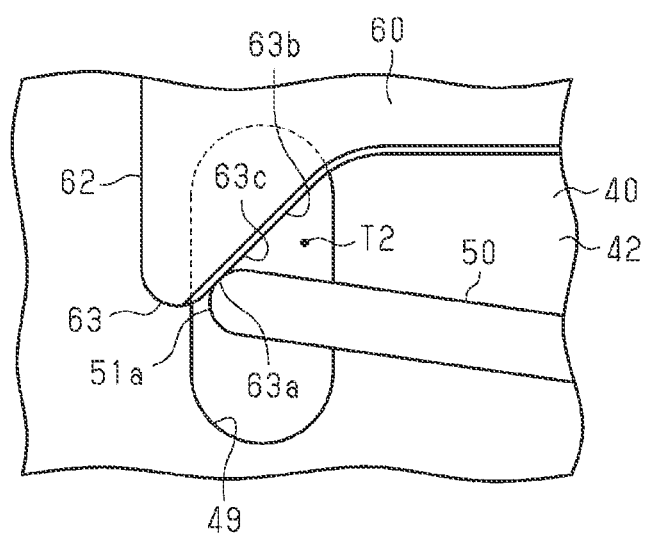
FIG. 10B is a schematic view illustrating a movable range of an end on one end side in a locking spring of the present embodiment.

As illustrated in FIG. 10A, in the related art, a range (movable range T1) in which the end 101d on the one end side of the locking spring 101 is allowed to move covers an entire range in the through-hole 103 provided in side wall portions of the upper rail 102. In contrast, as illustrated in FIG. 10B, in the present embodiment, the lower end portion 63 of the bracket 60 overlaps the through-hole 49 provided in the side wall portion 42 of the upper rail 40, so that the bent portion 51a of the locking spring 50 is restricted from moving. In other words, the movable range T2 of the bent portion 51a is smaller than the entire range in the through-hole 49, which is the maximum movable range.

The operation and effect of the present embodiment will be described.

(1) The unlocking member 81 is rotatably attached to the mounting member 90. Further, the fourth wall portion 94 as the wire support wall that supports the wire 85 for operating the unlocking member 81 is connected to the mounting member 90. Since the fourth wall portion 94 is connected to the mounting member 90 to which the unlocking member 81 is attached, it is easy to improve accuracy of a positional relationship between the unlocking member 81 and the fourth wall portion 94. Therefore, it is easy to smoothly operate the unlocking member 81 using the wire 85.

(2) The unlocking member 81 is located inside the locking spring 50 in both the longitudinal direction and the width direction of the upper rail 40. Since the unlocking member 81 is located inside the locking spring 50 in both the longitudinal direction and the width direction of the upper rail 40, a space inside the locking spring 50 can be efficiently used, and thus the vehicle seat slide apparatus 10 can be miniaturized. Further, a range of motion of the unlocking member 81 can be widely secured by utilizing the space in the longitudinal direction of the upper rail 40. Therefore, an operation feeling of the unlocking member 81 can be improved.

(3) The fourth wall portion 94 is connected to the first wall portion 91 of the mounting member 90 in a state of being integrated with the first wall portion 91. Therefore, the number of members can be reduced as compared with an embodiment in which the fourth wall portion 94 and the mounting member 90 are formed as different members. Therefore, it is possible to improve work efficiency when assembling the vehicle seat slide apparatus 10.

(4) The third wall portion 93 is connected to the front end portion in the longitudinal direction of the mounting member 90. The third wall portion 93 functions as the spring material mounting wall to which the spring material 84 for urging the unlocking member 81 is attached. Since both the unlocking member 81 and the third wall portion 93 are attached to the mounting member 90, it is easy to improve accuracy of a positional relationship between the unlocking member 81 and the third wall portion 93.

(5) The fourth wall portion 94 as the wire support wall is connected to the rear end portion in the longitudinal direction of the mounting member 90. Therefore, it is possible to suppress interference of the fourth wall portion 94 with other members attached to the mounting member 90.

(6) The upper rail 40 has the during locking restricting portion (lower side 63*a* in the lower end portion 63 of the contact wall 62). When the locking spring 50 and the lower rail 30 are in the engaged state, the during locking restricting portion restricts the movement of the one end side of the locking spring 50 by contacting the one end side of the locking spring 50.

Therefore, the upper rail 40 has the during locking restricting portion that restricts the movement of the one end side of the locking spring 50 by contacting the one end side in the longitudinal direction of the locking spring 50, so that the urging force of the locking spring 50 can be suitably maintained when the locking spring 50 and the lower rail 30 are in the engaged state. Therefore, the stability of the engaged state of the locking portion can be improved.

(7) The upper rail 40 has the during unlocking restricting portion (upper side 63*b* in the lower end portion 63 of the contact wall 62). The during unlocking restricting portion does not contact the locking spring 50 when the locking spring 50 and the lower rail 30 are in the engaged state, and contacts the one end side of the locking spring 50 when the engagement state between the locking spring 50 and the lower rail 30 is released, so that the during unlocking restricting portion restricts the movement of the one end side of the locking spring 50.

Therefore, since the upper rail 40 has the during unlocking restricting portion, the urging force of the locking spring 50 can be suitably maintained even when the engagement state between the locking spring 50 and the lower rail 30 is released. Therefore, the urging force of the locking spring 50 can be suitably maintained both at the time of locking and at the time of unlocking. Therefore, the stability of the engaged state of the locking portion can be further improved.

Further, when the engagement state between the locking spring 50 and the lower rail 30 is shifted to a state in which the engagement state between the locking spring 50 and the lower rail 30 is released, the bent portion 51*a* of the locking spring 50 is allowed to move to the during unlocking restricting portion from the during locking restricting portion. Therefore, the stress applied to the locking spring 50 can be suitably relieved.

(8) The inclined portion inclined upward toward the other end side of the locking spring 50 is provided between the during locking restricting portion and the during unlocking restricting portion. Therefore, the one end side of the locking spring 50 can be smoothly moved between the during locking restricting portion and the during unlocking restricting portion.

(9) The bracket 60 is attached to the upper rail 40, and the during locking restricting portion and the during unlocking restricting portion are provided in the bracket 60. Therefore, it is easy to provide the during locking restricting portion and the during unlocking restricting portion at suitable positions of the upper rail 40. Therefore, since the degree of freedom in design is improved, the urging force of the locking spring 50 can be easily maintained appropriately.

(10) The unlocking member 81 is attached to the mounting member 90. By utilizing the mounting member 90 attached to the inside of the upper rail 40 as a member for attaching the unlocking member 81, the internal space S2 of the upper rail 40 can be effectively used.

The present embodiment can be modified and implemented as follows. The present embodiment and the following modifications can be implemented in combination with each other to the extent that they are technically consistent.

In the present embodiment, the bracket 60 has both the during locking restricting portion and the during unlocking restricting portion. However, the bracket 60 is not limited to this aspect. While the bracket 60 has the during locking restricting portion, it may not have the during unlocking restricting portion.

In the present embodiment, the inclined portion in the lower end portion 63 of the contact wall 62 of the bracket 60 may be omitted. That is, when the bracket 60 has the during locking restricting portion and the during unlocking restricting portion, they may not be connected by the inclined portion.

In the present embodiment, the during locking restricting portion and the during unlocking restricting portion are provided in the bracket 60. However, the during locking restricting portion and the during unlocking restricting portion are not limited to this embodiment. The during locking restricting portion and the during unlocking restricting portion may be provided directly in the upper rail 40. The during locking restricting portion and the during unlocking restricting portion may be formed as separate members.

For example, a shape of an upper end portion of the through-hole 49 of the upper rail 40 may be configured to be inclined upward from the front to the rear in the front-rear direction DY. Further, the bent portion 51*a* of the locking spring 50 may be brought into contact with an inner circumference of the through-hole 49.

Figure 11A:
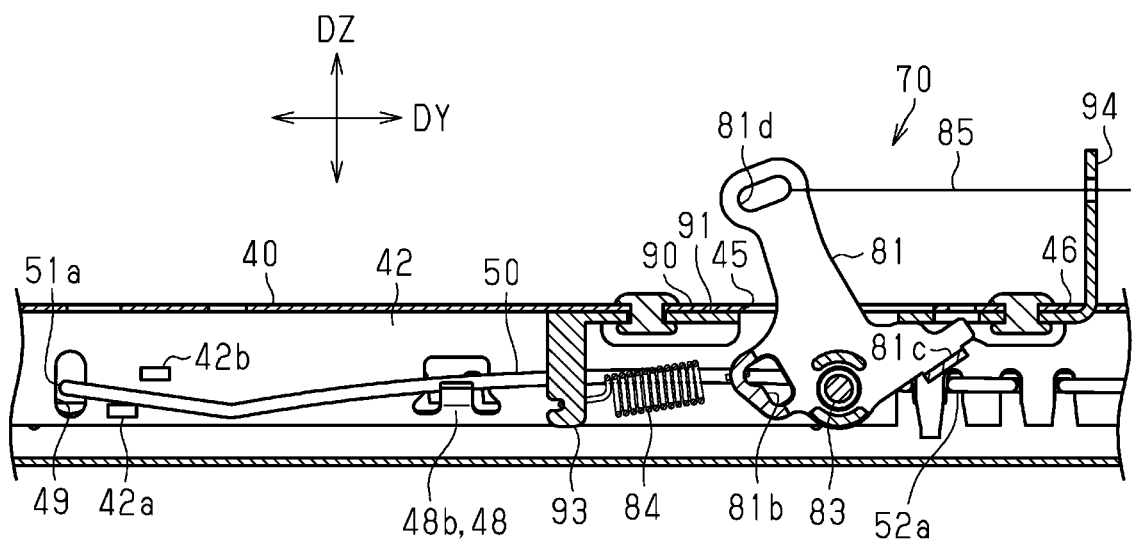
FIG. 11A is a partial cross-sectional view of a vehicle seat slide apparatus of a modification in a locked state.
Figure 11B:
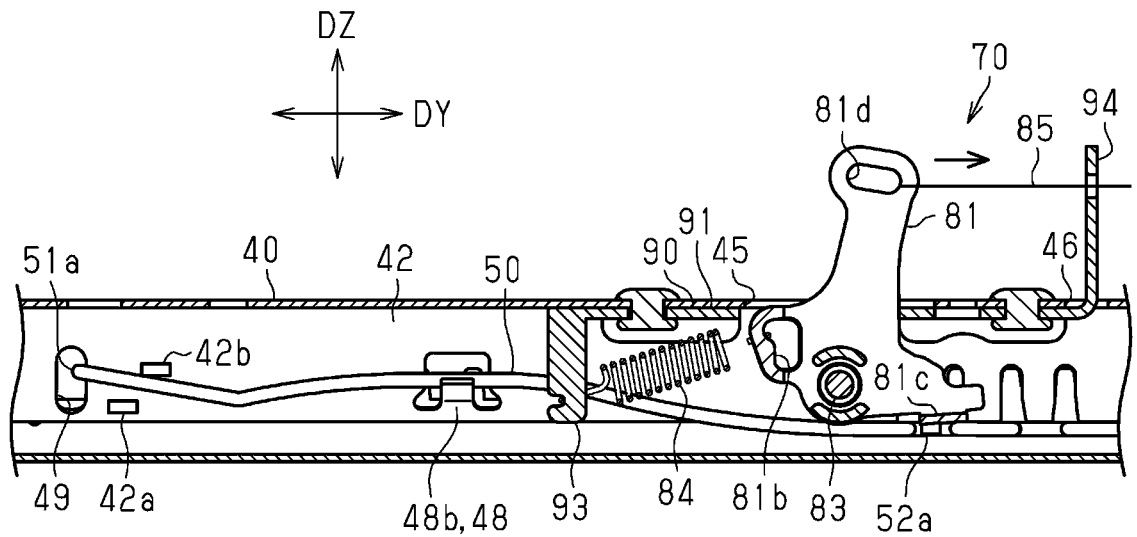
FIG. 11B is a partial cross-sectional view of the vehicle seat slide apparatus in an unlocked state.

As illustrated in FIGS. 11A and 11B, for example, the side wall portion 42 of the upper rail 40 may be provided with a plurality of projecting portions projecting inward in the width direction DX by cutting and raising or the like. In this case, for example, one of the projecting portions (hereinafter, also referred to as a "first projecting portion") 42*a* is configured to contact a lower portion on the one end side of the locking spring 50 in the locked state. Further, for example, another of the projecting portions (hereinafter, also referred to as a "second projecting portion") 42*b* is configured to contact an upper portion on the one end side of the locking spring 50 in the unlocked state. The first projecting portion 42*a* does not contact the locking spring 50 in the unlocked state. Similarly, the second projecting portion 42*b* does not contact the locking spring 50 in the locked state. In this aspect, since the first projecting portion 42*a* or the second projecting portion 42*b* contacts the one end side of the locking spring 50, it is possible to restrict the one end side of the locking spring 50 from moving forward in the front-rear direction DY or upward in the vertical direction DZ. Therefore, it is possible to suppress the reduction of the urging force of the locking spring 50. In the aspect including the first projecting portion 42*a*, the second locking portion 48*b* of the upper rail 40 may be omitted.

The bent portion 51*a* of the locking spring 50 may be configured to contact the lower end portion 63 of the contact wall 62 of the bracket 60. In this case, the through-hole 49 of the upper rail 40 may be omitted.

Figure 12:
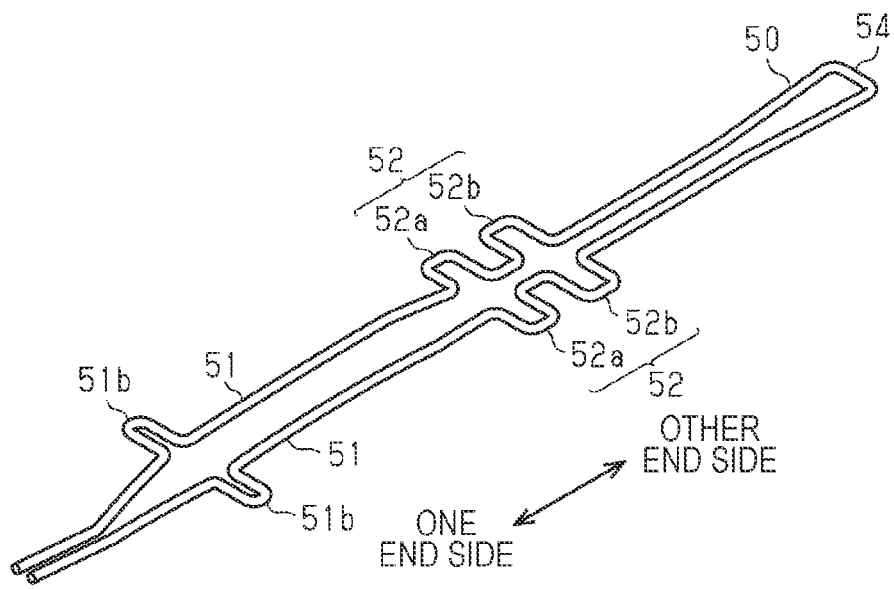
FIG. 12 is a perspective view of a locking spring of a modification.
Figure 13:
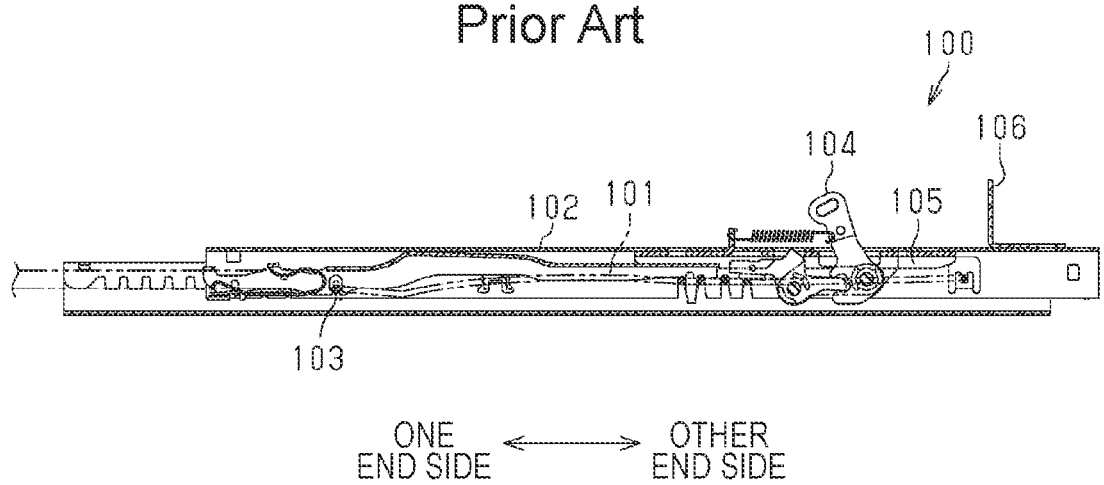
FIG. 13 is a cross-sectional view of a vehicle seat slide apparatus of a related technology.

As illustrated in FIG. 12, a position of the bent portion of the locking spring 50 is not limited to the end on the one end side of the locking spring 50. A bent portion 51b may be provided around the end on the one end side of the locking spring 50.

The unlocking member 81 may be attached to a member other than the mounting member 90. The unlocking member 81 may be attached to a member attached to the inside of the upper rail 40, which is different from the mounting member 90. Further, the unlocking member 81 may be attached to a member attached to an outside of the upper rail 40. Furthermore, the unlocking member 81 may be configured to be directly attached to the upper rail 40.

In the present embodiment, the first wall portion, the second wall portion, the third wall portion, and the fourth wall portion of the mounting member 90 are formed of one plate material. However, these walls are not limited to this aspect. At least one of the first wall portion, the second wall portion, the third wall portion, and the fourth wall portion may be formed of a separated plate material, and may be connected to the remaining plate material of the first wall portion, the second wall portion, the third wall portion, and the fourth wall portion.

The fourth wall portion 94 as the wire support wall may be connected to a portion other than the rear end portion in the longitudinal direction of the mounting member 90.

The third wall portion 93 as the spring material mounting wall may be connected to a portion other than the front end portion in the longitudinal direction of the mounting member 90.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vehicle seat slide apparatus comprising:
a lower rail;
an upper rail that is movably attached to the lower rail and supports a seat;
an annularly formed locking spring that is attached to the upper rail and has a locking portion for restricting movement of the upper rail by engaging with the lower rail; and
an unlocking member that is attached to the upper rail and displaces the locking spring to release an engagement state between the locking spring and the lower rail to release movement restriction of the upper rail, wherein
the unlocking member is located inside the locking spring in both a longitudinal direction and a width direction of the upper rail,
the unlocking member is rotatably attached to a mounting member, and
the mounting member is provided with a wire support wall that supports a wire for operating the unlocking member.

2. The vehicle seat slide apparatus according to claim 1, wherein a spring material mounting wall to which a spring material for urging the unlocking member is attached is connected to one end portion in a longitudinal direction of the mounting member.

3. The vehicle seat slide apparatus according to claim 2, wherein the wire support wall is connected to an other end portion in the longitudinal direction of the mounting member.

* * * * *